(12) United States Patent
Mori et al.

(10) Patent No.: US 10,910,008 B2
(45) Date of Patent: Feb. 2, 2021

(54) MAGNETIC RECORDING MEDIUM HAVING SPECIFIC SURFACE CHARACTERISTICS AND MAGNETIC RECORDING AND REPRODUCING DEVICE

(71) Applicant: FUJIFILM Corporation, Tokyo (JP)

(72) Inventors: Masahiko Mori, Minami-ashigara (JP); Yoshihiro Sawayashiki, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 205 days.

(21) Appl. No.: 16/115,962

(22) Filed: Aug. 29, 2018

(65) Prior Publication Data
US 2019/0074032 A1 Mar. 7, 2019

(30) Foreign Application Priority Data
Sep. 7, 2017 (JP) .................................. 2017-172534

(51) Int. Cl.
*G11B 5/714* (2006.01)
*G11B 5/733* (2006.01)
*G11B 5/708* (2006.01)

(52) U.S. Cl.
CPC .............. *G11B 5/714* (2013.01); *G11B 5/708* (2013.01); *G11B 5/7085* (2013.01); *G11B 5/733* (2013.01)

(58) Field of Classification Search
None
See application file for complete search history.

(56) References Cited

U.S. PATENT DOCUMENTS

| 5,202,810 | A | * | 4/1993 | Nakamura | G11B 5/82 216/22 |
| 5,388,020 | A | * | 2/1995 | Nakamura | G11B 5/6005 360/135 |
| 5,820,969 | A | * | 10/1998 | Satoh | G11B 5/58 428/141 |
| 8,535,817 | B2 | * | 9/2013 | Imaoka | G11B 5/70 428/844 |
| 9,959,894 | B2 | * | 5/2018 | Omura | G11B 5/733 |
| 2004/0131892 | A1 | * | 7/2004 | Sueki | G11B 5/70 428/842 |
| 2008/0057351 | A1 | * | 3/2008 | Meguro | G11B 5/735 428/840 |
| 2013/0260179 | A1 | * | 10/2013 | Kasada | G11B 5/7013 428/840.2 |

FOREIGN PATENT DOCUMENTS

JP    2000-30237 A    1/2000

* cited by examiner

*Primary Examiner* — Kevin M Bernatz
(74) *Attorney, Agent, or Firm* — Sughrue Mion, PLLC

(57) ABSTRACT

The magnetic recording medium includes a non-magnetic support; a non-magnetic layer including a non-magnetic powder and a binding agent on the non-magnetic support; and a magnetic layer including a ferromagnetic powder, a binding agent, and a non-magnetic powder on the non-magnetic layer, in which a skewness Rsk obtained using an atomic force microscope in a measurement region of a surface of the magnetic layer having a size of 5 μm×5 μm is greater than 0, a maximum peak height Rmax is equal to or smaller than 30.0 nm, and the number of projections having a height equal to or greater than 10 nm is equal to or greater than 10, and a magnetic recording and reproducing device including: this magnetic recording medium; and a magnetic head.

14 Claims, No Drawings

MAGNETIC RECORDING MEDIUM HAVING SPECIFIC SURFACE CHARACTERISTICS AND MAGNETIC RECORDING AND REPRODUCING DEVICE

CROSS-REFERENCE TO RELATED APPLICATIONS

This application claims priority under 35 U.S.C 119 to Japanese Patent Application No. 2017-172534 filed on Sep. 7, 2017. The above application is hereby expressly incorporated by reference, in its entirety, into the present application.

BACKGROUND OF THE INVENTION

1. Field of the Invention

The present invention relates to a magnetic recording medium and a magnetic recording and reproducing device.

2. Description of the Related Art

A coating type magnetic recording medium including a non-magnetic layer including non-magnetic powder and a binding agent and a magnetic layer including ferromagnetic powder and a binding agent on a non-magnetic support, in this order, is known as a magnetic recording medium (for example, see examples in JP2000-30237A).

SUMMARY OF THE INVENTION

In a case of reproducing information recorded on a magnetic recording medium by causing the magnetic recording medium to run in a magnetic recording and reproducing device to bring a surface of a magnetic layer into contact with a magnetic head, an increase in coefficient of friction causes a decrease in running stability (for example, occurrence of sticking between the surface of the magnetic layer and the magnetic head) and/or chipping of the surface of the magnetic layer. In order to prevent occurrence of such a phenomenon, it is desired to decrease a coefficient of friction at the time of running, by decreasing a contact area in a case where the surface of the magnetic layer comes into contact with the magnetic head (so-called real contact area), by causing the magnetic layer to include non-magnetic powder and applying suitable roughness to the surface of the magnetic layer due to a presence state of this non-magnetic powder (for example, a degree of projections of particles configuring the non-magnetic powder from the surface of the magnetic layer).

However, meanwhile, it is generally said that a small degree of roughness of the surface of the magnetic recording medium is preferable (for example, see paragraph 0015 of JP2000-30237A). This is because that, in a case where the surface of the magnetic layer is roughened, an output decrease occurs due to an increase in spacing between the surface of the magnetic layer and the magnetic head, in a case of reproducing information recorded on the magnetic recording medium, and electromagnetic conversion characteristics (SNR; Signal-to-Noise ratio) decrease.

As described above, the improvement of electromagnetic conversion characteristics and a decrease in coefficient of friction at the time of running are in a trade-off relationship and it is not easy to satisfy both of them.

Therefore, an aspect of the invention provides for a magnetic recording medium capable of achieving both improvement of electromagnetic conversion characteristics and a decrease in coefficient of friction at the time of running.

According to one aspect of the invention, there is provided a magnetic recording medium comprising: a non-magnetic support; a non-magnetic layer including a non-magnetic powder and a binding agent on the non-magnetic support; and a magnetic layer including a ferromagnetic powder, a binding agent, and a non-magnetic powder on the non-magnetic layer, in which a skewness Rsk obtained using an atomic force microscope in a measurement region of a surface of the magnetic layer having a size of 5 μm×5 μm (hereinafter, also referred to as "Rsk (of the magnetic layer)") is greater than 0, a maximum peak height Rmax (hereinafter, also referred to as "Rmax (of the magnetic layer)") is equal to or smaller than 30.0 nm, and the number of projections having a height equal to or greater than 10 nm (hereinafter, also referred to as the "number of projections having a height equal to or greater than 10 nm (on the magnetic layer)") is equal to or greater than 10.

In one aspect, a thickness of the non-magnetic layer is equal to or smaller than 1.0 μm.

In one aspect, a proportion of voids in a cross section image obtained by imaging a cross section of the non-magnetic layer with a scanning electron microscope is equal to or smaller than 10.0%.

In one aspect, the proportion of voids (hereinafter, also referred to as a "void volume") is 1.0% to 10.0%.

In one aspect, the skewness Rsk is greater than 0.10.

In one aspect, the maximum peak height Rmax is 10.0 to 30.0 nm.

In one aspect, the number of projections is 10 to 60.

In one aspect, the non-magnetic powder included in the non-magnetic layer includes carbon black.

In one aspect, a specific surface area of carbon black included in the non-magnetic layer is 280 to 500 m$^2$/g.

In one aspect, the non-magnetic layer includes carbon black, a mass of which is equal to or greater than 30.0% by mass with respect to a total amount of the non-magnetic powder.

In one aspect, the non-magnetic powder included in the magnetic layer includes at least colloid particles.

In one aspect, the colloid particles are silica colloid particles.

In one aspect, a surface electrical resistance value Rs of the surface of the magnetic layer is smaller than $1.0 \times 10^{+7}$ Ω/sq. The unit Ω/sq (ohms per square) is a unit which cannot be converted into the unit SI.

According to another aspect of the invention, there is provided a magnetic recording and reproducing device comprising: the magnetic recording medium; and a magnetic head.

According to one aspect of the invention, it is possible to provide a magnetic recording medium capable of satisfying both improvement of electromagnetic conversion characteristics and a decrease in coefficient of friction at the time of running, and a magnetic recording and reproducing device including this magnetic recording medium.

DESCRIPTION OF THE PREFERRED EMBODIMENTS

Magnetic Recording Medium

One aspect of the invention relates to a magnetic recording medium including: a non-magnetic support; a non-magnetic layer including non-magnetic powder and a binding agent on the non-magnetic support; and a magnetic layer including ferromagnetic powder, a binding agent, and non-magnetic powder on the non-magnetic layer, in which a skewness Rsk obtained by using an atomic force microscope in a measurement region of a surface of the magnetic layer having a size of 5 μm×5 μm is greater than 0, a maximum peak height Rmax is equal to or smaller than 30.0 nm, and the number of projections having a height equal to or greater than 10 nm is equal to or greater than 10.

In the invention and the specification, all of the skewness Rsk, the maximum peak height Rmax, and the number of projections having a height equal to or greater than 10 nm are obtained by measurement by using an atomic force microscope (AFM). Specifically, from a plane view image of the surface of the magnetic layer obtained by using the AFM, the skewness Rsk is obtained based on JIS B 0601: 2013 and the maximum peak height Rmax is obtained based on a description regarding the maximum peak height of JIS B 0601:2001. Meanwhile, regarding the number of projections, a surface having equivalent volumes of protruded component and recess component in a measurement region in the plane view image obtained with the AFM is determined as a reference surface, and the number of projections having a height equal to or greater than 10 nm with respect to this reference surface is obtained. Among the projections having a height equal to or greater than 10 nm present in the measurement region, a projection, a part of which is in the measurement region and the other part is outside of the measurement region may be present. In a case of obtaining the number of projections, the number of projections is measured by including such projections.

The measurement region used in the measurement with the AFM is a region of the surface of the magnetic layer having a size of 5 μm×5 μm. The measurement is performed in three different measurement regions of the surface of the magnetic layer (n=3). The skewness Rsk, the maximum peak height Rmax, and the number of projections having a height equal to or greater than 10 nm are obtained as arithmetical means of three values obtained by the measurement. As an example of measurement conditions of the AFM, the following measurement conditions are used.

A measurement is performed in a region of the surface of the magnetic layer of the magnetic tape having a size of 5 μm×5 μm by using the AFM (Nanoscope 4 manufactured by Veeco Instruments, Inc.) in a tapping mode. RTESP-300 manufactured by Bruker Corporation is used as a probe, a resolution is set as 512 pixel×512 pixel, and a scanning speed is a speed measured in a case where the scanning speed in one screen (512 pixel×512 pixel) is 341 seconds.

In the magnetic recording medium according to one aspect of the invention, the skewness Rsk obtained by using an atomic force microscope in a measurement region of a surface of the magnetic layer having a size of 5 μm×5 μm is greater than 0, the maximum peak height Rmax is equal to or smaller than 30.0 nm, and the number of projections having a height equal to or greater than 10 nm is equal to or greater than 10. The inventors have considered that the surface of the magnetic layer where the Rsk, the Rmax, and the number of projections having a height equal to or greater than 10 nm are in the ranges described above, is in a state of including projections having higher flatness of a portion having a small height (hereinafter, referred to as a "base portion") than the flatness of the projections having a height equal to or greater than 10 nm, and capable of decreasing a coefficient of friction while maintaining a small spacing between the surface of the magnetic layer and the magnetic head. In addition, regarding the base portion, a portion on the surface of the magnetic layer, which mainly comes into contact with the magnetic head, in a case of running of the magnetic recording medium in the magnetic recording and reproducing device is a projection. However, in a case where the flatness of the base portion is deteriorated, a contact frequency of the base portion and the magnetic head increases, thereby increasing a contact area of the surface of the magnetic layer and the magnetic head (so-called real contact area) and increasing a coefficient of friction. Accordingly, the inventors have thought that high flatness of the base portion also contributes to a decrease in coefficient of friction at the time of running.

However, the above description is merely a surmise of the inventors and the invention is not limited thereto.

Hereinafter, the magnetic recording medium will be described more specifically. In the invention and the specification, the "powder" means an aggregate of a plurality of particles. For example, the non-magnetic powder is an aggregate of a plurality of non-magnetic particles and the ferromagnetic powder is an aggregate of a plurality of ferromagnetic particles. The "aggregate" not only includes an aspect in which particles configuring the aggregate are directly in contact with each other, but also includes an aspect in which a binding agent or an additive is interposed between the particles. A term "particles" is also used for describing the aggregate of the particles (that is, powder). In addition, in the invention and the specification, the "surface of the magnetic layer" is identical to the surface of the magnetic recording medium on the magnetic layer side.

Regarding a particle size of various powders, in the invention and the specification, average particle sizes are values measured by the following method with a transmission electron microscope, unless otherwise noted.

The powder is imaged at a magnification ratio of 100,000 with a transmission electron microscope, the image is printed on photographic printing paper so that the total magnification of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly selected. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software.

In the invention and the specification, unless otherwise noted, (1) in a case where the shape of the particle observed in the image of the particle described above is a needle shape, a fusiform shape, or a columnar shape (here, a height is greater than a maximum long diameter of a bottom surface), the particle size of the particles configuring the powder is shown as a length of a long axis configuring the particle, that is, a long axis length, (2) in a case where shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, unless otherwise noted, in a case of definition of the particle size (1), the average particle size is an average long axis length, in a case of the definition (2), the average particle size is an average plate diameter. In a case of the definition (3), the average particle size is an average diameter (also referred to as an average particle diameter).

In the invention and the specification, the specific surface area of the powder is a specific surface area obtained by using a Brunauer-Emmett-Teller (BET) method introduced from Brunauer, Emmett, and Teller by a nitrogen adsorption method based on JIS K 6217-7:2013. The specific surface area obtained as described above can be an index for the particle size of the primary particles of the particles configuring the powder. It is thought that, as the specific surface area is great, the particle size of the primary particles of the particles configuring the powder is small. The specific surface area of various powders used in examples and comparative examples which will be described later is a specific surface area measured regarding raw material powder used in the preparation of each layer forming composition. However, the powder can be extracted from the magnetic recording medium by a well-known method and a specific surface area of the extracted powder can be obtained.

Magnetic Layer

Skewness Rsk

The Rsk of the magnetic layer of the magnetic recording medium is greater than 0. The Rsk is also described in JP2000-30237A. However, the Rsk described in JP2000-30237A is a value obtained by using a three-dimensional surface roughness meter as disclosed in a paragraph 0073 of JP2000-30237A. In the three-dimensional surface roughness meter, a horizontal resolution is generally limited to at least approximately 50 µm. In addition, in the three-dimensional surface roughness meter, the size of the measurement region is generally approximately 200 µm×200 µm to 400 µm×400 µm and is significantly greater than the measurement region (5 µm×5 µm) in the measurement performed by using the AFM for obtaining the Rsk described in the invention and the specification. Accordingly, the Rsk obtained by using the three-dimensional surface roughness meter does not correlate to Rsk obtained by the measurement performed in the measurement region having a size of 5 µm×5 µm by using the AFM. This point became clear as a result of intensive studies of the inventors. The inventors have thought that, regarding the surface of the magnetic layer where the Rmax is equal to or smaller than 30.0 nm and the number of projections having a height equal to or greater than 10 nm is equal to or greater than 10, the Rsk obtained by the measurement performed in the measurement region having a size of 5 µm×5 µm by using the AFM greater than 0 (that is, positive value of Rsk) indicates high flatness of the base portion of the surface of the magnetic layer. The inventors have surmised that this contributes to a decrease in coefficient of friction at the time of running. From a viewpoint of further decreasing the coefficient of friction, the Rsk is preferably equal to or greater than 0.10, more preferably greater than 0.10, even more preferably equal to or greater than 0.20, still preferably equal to or greater than 0.25, still more preferably equal to or greater than 0.40, and still even more preferably equal to or greater than 0.50. In addition, the Rsk can be, for example, equal to or smaller than 1.00, equal to or smaller than 0.90, equal to or smaller than 0.80, or equal to or smaller than 0.75. However, the inventors have surmised that, regarding the surface of the magnetic layer where the Rmax is equal to or smaller than 30.0 nm and the number of projections having a height equal to or greater than 10 nm is equal to or greater than 10, as the Rsk is great, the flatness of the base portion is high. Accordingly, an upper limit of the Rsk may be greater than the value exemplified above.

Maximum Peak Height Rmax

The Rmax of the magnetic layer of the magnetic recording medium is equal to or smaller than 30.0 nm. It is thought that the Rmax equal to or smaller than 30.0 nm regarding the surface of the magnetic layer where the number of projections having a height equal to or greater than 10 nm is equal to or greater than 10 indicates that the surface of the magnetic layer is in a state of including projections capable of decreasing a coefficient of friction while maintaining a small spacing between the surface of the magnetic layer and the magnetic head (that is, low spacing). The low spacing contributes to the improvement of electromagnetic conversion characteristics. From a viewpoint of further improving electromagnetic conversion characteristics, the Rmax is preferably equal to or smaller than 28.0 nm, more preferably equal to or smaller than 25.0 nm, and even more preferably equal to or smaller than 23.0 nm. The Rmax can be, for example, equal to or greater than 10.0 nm or equal to or greater than 15.0 nm.

Number of Projections Having Height Equal to or Greater Than 10 nm

The number of projections of the magnetic layer of the magnetic recording medium having a height equal to or greater than 10 nm is equal to or greater than 10. The inventors have thought that the projection having a height equal to or greater than 10 nm is a projection which can contribute to a decrease in coefficient of friction, and it is possible to decrease the coefficient of friction by setting the number of projections to be equal to or greater than 10. From a viewpoint of further decreasing the coefficient of friction, the number of projections having a height equal to or greater than 10 nm is preferably equal to or greater than 12, more preferably equal to or greater than 15, even more preferably equal to or greater than 20, still preferably equal to or greater than 25, and still more preferably equal to or greater than 30. In addition, the number of projections of the magnetic layer having a height equal to or greater than 10 nm can be, for example, equal to or smaller than 60, equal to or smaller than 55, equal to or smaller than 50, or equal to or smaller than 45.

Adjusting methods of the Rsk, the Rmax, and the number of projections having a height equal to or greater than 10 nm will be described later.

Non-Magnetic Powder

The magnetic recording medium includes non-magnetic powder in the magnetic layer. It is preferable that the magnetic layer at least includes non-magnetic powder which contributes to formation of projections having a height equal to or greater than 10 nm on the surface of the magnetic layer (hereinafter, referred to as a "projection formation agent"), as the non-magnetic powder. It is also preferable that the magnetic layer includes non-magnetic powder which functions as an abrasive (hereinafter, referred to as an "abrasive"). Hereinafter, the projection formation agent and the abrasive will be further described.

Projection Formation Agent

The projection formation agent may be inorganic powder or organic powder.

Examples of the inorganic powder include powder of inorganic oxide such as metal oxide, metal carbonate, metal sulfate, metal nitride, metal carbide, and metal sulfide, and the powder of inorganic oxide is preferable. In one aspect, from a viewpoint of homogenization of friction properties, particle size distribution of the projection formation agent is not polydispersion having a plurality of peaks in the particle size distribution and is preferably monodisperse showing a single peak. From a viewpoint of availability of the monodisperse particles, the projection formation agent is preferably inorganic powder.

Regarding an average particle size of the projection formation agent, from a viewpoint of ease to set the number of projections having a height equal to or greater than 10 nm to be equal to or greater than 10, a value obtained by a relationship expression $\phi/t$ of an average particle size $\phi$ and a thickness t of the magnetic layer is preferably equal to or greater than 1.1 and more preferably equal to or greater than 1.2. In addition, from a viewpoint of ease to set the Rmax to be equal to or smaller than 30.0 nm, a value obtained by the relationship expression $\phi/t$ is preferably equal to or smaller than 3.0 and more preferably equal to or smaller than 2.5. In a case of calculating $\phi/t$, the values with the same unit (for example, nm) are used for $\phi$ and t. In addition, the average particle size of the projection formation agent is, for example, preferably 90 to 200 nm and more preferably 100 to 150 nm.

From a viewpoint of further improving electromagnetic conversion characteristics, it is preferable that a variation of the particle sizes of the particles of the projection formation agent is small. A decree of the variation of the particle sizes can be evaluated by a coefficient of variation (CV value). Here, CV value (unit: %)=$(\sigma/\phi)\times 100$, and $\phi$ is the average particle size and is obtained by the method described above. $\sigma$ is a standard deviation of the particle sizes of 500 particles, the particle sizes of which are measured in a case of obtaining the average particle size. The CV value of the projection formation agent is preferably smaller than 30.0%, more preferably equal to or smaller than 20.0%, even more preferably 15.0%, still preferably equal to or smaller than 12.0%, and still more preferably equal to or smaller than 10.0%. The CV value of the projection formation agent can be, for example, equal to or greater than 3.0%. However, a small variation of the particle sizes of the projection formation agent is preferable, from a viewpoint of electromagnetic conversion characteristics, and thus, the CV value may be smaller than 3.0%.

As the projection formation agent having a small CV value, colloid particles can be used. The "colloid particles" in the invention and the specification are particles which are not precipitated and dispersed to generate a colloidal dispersion, in a case where 1 g of the particles per 100 mL of the organic solvent is added to at least one organic solvent of methyl ethyl ketone, cyclohexanone, toluene, or ethyl acetate, or a mixed solvent including two or more kinds of the solvent described above at a random mixing ratio. In a case of determining whether or not the non-magnetic powder included in the magnetic layer is colloid particles, the evaluation may be performed whether or not the non-magnetic powder has properties corresponding to the properties defined as that of the colloid particles, in a case where the non-magnetic powder used in the formation of the magnetic layer can be available. Alternatively, it is also possible to evaluate whether or not the non-magnetic powder extracted from the magnetic layer has properties corresponding to the properties defined as that of the colloid particles. The extraction of the non-magnetic powder from the magnetic layer can be, for example, performed by a method disclosed in a paragraph 0045 of JP2017-68884A.

Specific examples of the colloid particles include inorganic oxide colloid particles such as $SiO_2$, $Al_2O_3$, $TiO_2$, $ZrO_2$, or $Fe_2O_3$, and colloid particles of composite inorganic oxide such as $SiO_2 \cdot Al_2O_3$, $SiO_2 \cdot B_2O_3$, $TiO_2 \cdot CeO_2$, $SnO_2 \cdot Sb_2O_3$, $SiO_2 \cdot Al_2O_3 \cdot TiO_2$, or $TiO_2 \cdot CeO_2$. $SiO_2$. Regarding the description of the composite inorganic oxide, a symbol "·" is used for showing composite inorganic oxide of inorganic oxide before and after the symbol. For example, $SiO_2 \cdot Al_2O_3$ means composite inorganic oxide of $SiO_2$ and $Al_2O_3$. As the colloid particles, colloid particles of silicon dioxide (silica), that is, silica colloid particles (also referred to as "colloidal silica") are particularly preferable. In addition, regarding the colloid particles, a description disclosed in paragraphs 0048 to 0049 of JP2017-68884A can also be referred to.

A content of the projection formation agent in the magnetic layer is preferably 0.1 to 10.0 parts by mass, more preferably 0.1 to 5.0 parts by mass, and even more preferably 1.0 to 5.0 parts by mass with respect to 100.0 parts by mass of the ferromagnetic powder. In the invention and the specification, certain components may be used as one kind or two or more kinds thereof. In a case of using two or more kinds, the content thereof is a total content of two or more kinds thereof.

Abrasive

The abrasive is a component capable of exhibiting ability of removing attached materials attached to the magnetic head during running (abrasiveness).

Examples of the abrasive include powder of alumina ($Al_2O_3$), silicon carbide, boron carbide ($B_4C$), TiC, chromium oxide ($Cr_2O_3$), cerium oxide, zirconium oxide ($ZrO_2$), iron oxide, diamond, and the like which are materials normally used as the abrasive of the magnetic layer, and among these, powder of alumina such as $\alpha$-alumina, silicon carbide, and diamond are preferable. A content of the abrasive in the magnetic layer is preferably 1.0 to 20.0 parts by mass, more preferably 3.0 to 15.0 parts by mass, and even more preferably 4.0 to 10.0 parts by mass with respect to 100.0 parts by mass of the ferromagnetic powder. Regarding particle size of the abrasive, a specific surface area which is an index for the particle size is, for example, equal to or greater than 14 m2/g, preferably equal to or greater than 16 m2/g, and more preferably equal to or greater than 18 m2/g. In addition, the specific surface area of the abrasive can be, for example, equal to or smaller than 40 m2/g.

Ferromagnetic Powder

As the ferromagnetic powder included in the magnetic layer, ferromagnetic powder normally used in the magnetic layer of various magnetic recording media can be used. It is preferable to use ferromagnetic powder having a small average particle size, from a viewpoint of improvement of recording density of the magnetic recording medium. From this viewpoint, ferromagnetic powder having an average particle size equal to or smaller than 50 nm is preferably used as the ferromagnetic powder. Meanwhile, the average particle size of the ferromagnetic powder is preferably equal to or greater than 10 nm, from a viewpoint of stability of magnetization.

As a preferred specific example of the ferromagnetic powder, ferromagnetic hexagonal ferrite powder can be used. An average particle size of the ferromagnetic hexagonal ferrite powder is preferably 10 nm to 50 nm and more preferably 20 nm to 50 nm, from a viewpoint of improvement of recording density and stability of magnetization. For details of the ferromagnetic hexagonal ferrite powder, descriptions disclosed in paragraphs 0012 to 0030 of JP2011-225417A, paragraphs 0134 to 0136 of JP2011-216149A, and paragraphs 0013 to 0030 of JP2012-204726A can be referred to, for example.

As a preferred specific example of the ferromagnetic powder, ferromagnetic metal powder can also be used. An average particle size of the ferromagnetic metal powder is preferably 10 nm to 50 nm and more preferably 20 nm to 50 nm, from a viewpoint of improvement of recording density and stability of magnetization. For details of the ferromagnetic metal powder, descriptions disclosed in paragraphs 0137 to 0141 of JP2011-216149A and paragraphs 0009 to 0023 of JP2005-251351A can be referred to, for example.

The content (filling percentage) of the ferromagnetic powder of the magnetic layer is preferably 50% to 90% by mass and more preferably 60% to 90% by mass. A high filling percentage of the ferromagnetic powder in the magnetic layer is preferable from a viewpoint of improvement recording density.

Binding Agent and Curing Agent

The magnetic recording medium is a coating type magnetic recording medium and includes a binding agent in the magnetic layer. The binding agent is one or more kinds of resin. As the binding agent, various resins normally used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in the non-magnetic layer and/or a back coating layer which will be described later. For the binding agent described above, description disclosed in paragraphs 0028 to 0031 of JP2010-24113A can be referred to. The binding agent of the non-magnetic layer will be further described later.

An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC) under the following measurement conditions. The weight-average molecular weight of the binding agent shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the resin which can be used as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. This point is the same as regarding a layer formed by using a composition, in a case where the composition used for forming the other layer includes the curing agent. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of the magnetic layer.

Additives

The magnetic layer includes ferromagnetic powder, a binding agent, and the non-magnetic powder, and may include one or more kinds of additives, if necessary. As the additives, the curing agent described above is used as an example. In addition, examples of the additive included in the magnetic layer include a lubricant, a dispersing agent, a dispersing assistant, an antibacterial agent, an antistatic agent, and an antioxidant. As the additives, a commercially available product can be suitably selected according to the desired properties or manufactured by a well-known method, and can be used with any amount.

Thickness of Magnetic Layer

A thickness of the magnetic layer can be optimized according to a saturation magnetization amount of a magnetic head used, a head gap length, a recording signal band, and the like. The thickness of the magnetic layer is preferably equal to or smaller than 100 nm, more preferably 10 to 100 nm, even more preferably 20 to 90 nm, from a viewpoint of realization of high-density recording. The magnetic layer may be at least one layer, or the magnetic layer can be separated to two or more layers having magnetic properties, and a configuration regarding a well-known multilayered magnetic layer can be applied. A thickness of the magnetic layer which is separated into two or more layers is a total thickness of the layers.

Surface Electrical resistance Value Rs of Surface of Magnetic Layer

The magnetic recording medium having a low surface electrical resistance value Rs of the surface of the magnetic layer can prevent electrification. By preventing electrification, it is possible to prevent attachment of foreign materials such as dust which may cause occurrence of drop-out, to the surface of the magnetic layer due to the electrification. From a viewpoint of preventing the electrification, the surface electrical resistance value Rs of the surface of the magnetic layer (sheet resistivity) is preferably smaller than $1.0 \times 10^{+7}$ $\Omega$/sq and more preferably equal to or smaller than $1.0 \times 10^{+6}$ $\Omega$/sq. In addition, the surface electrical resistance value Rs of the surface of the magnetic layer can be, for example, equal to or greater than $1.0 \times 10^{+4}$ $\Omega$/sq. However, a low surface electrical resistance value Rs is preferable from a viewpoint of preventing electrification, and therefore, the low surface electrical resistance value Rs may be smaller than $1.0 \times 10^{+4}$ $\Omega$/sq. In the invention and the specification, the "surface electrical resistance value Rs" is set as a value measured at an applied voltage of 50 V and can be measured by a well-known method. For example, carbon black can exhibit a function of applying conductivity to the magnetic recording medium, and thus, it is possible to decrease the surface electrical resistance value Rs of the surface of the magnetic layer by causing the non-magnetic layer positioning on a lower layer of the magnetic layer to include carbon black.

Non-Magnetic Layer

The magnetic recording medium includes a non-magnetic layer between the magnetic layer and the non-magnetic support. A void volume and a thickness of this non-magnetic layer mainly affect to the Rsk of the magnetic layer and the number of projections having a height equal to or greater than 10 nm. Hereinafter, the void volume and the thickness of the non-magnetic layer will be further described.

Void Volume of Non-Magnetic Layer

For example, as a void volume of the non-magnetic layer is low, deformation of the non-magnetic layer in a forming step of the magnetic recording medium (for example, deformation of the non-magnetic layer in a calender process) tends to be prevented. As the non-magnetic layer is easily deformed, the projection formation agent included in the magnetic layer easily penetrates to the non-magnetic layer side, and as a result, the number of projections of the magnetic layer having a height equal to or greater than 10 nm tends to decrease. Accordingly, it is thought that a decrease in void volume of the non-magnetic layer contributes to setting the number of projections of the magnetic layer having a height equal to or greater than 10 nm to be equal to or greater than 10. In addition, the non-magnetic layer having a high void volume tends to have a rough surface of the non-magnetic layer. It is thought that this is an effect of a presence state of the non-magnetic particles configuring the non-magnetic powder in the non-magnetic layer. In a case where the magnetic layer is formed on a rough surface of the non-magnetic layer, flatness of the base portion of the surface of the magnetic layer tends to decrease, and thus, it is thought that a decrease in void volume of the non-magnetic layer contributes to improvement of the flatness of the base portion of the surface of the magnetic layer. Therefore, it is thought that a decrease in void volume of the non-magnetic layer contributes to adjusting the Rsk of the magnetic layer, where the Rmax to be equal to or smaller than 30.0 nm and the number of projections having a height equal to or greater than 10 nm is equal to or greater than 10, to be greater than 0. From the viewpoint described above, the void volume of the non-magnetic layer is preferably equal to or smaller than 10.0%, more preferably equal to or smaller than 9.0%, even more preferably equal to or smaller than 8.0%, still preferably equal to or smaller than 7.5%, still more preferably equal to or smaller than 7.0%, still even more preferably equal to or smaller than 6.0%, and still further more preferably equal to or smaller than 5.0%. In addition, from a viewpoint of formability in a calender process, the void volume of the non-magnetic layer is preferably equal to or greater than 1.0%, more preferably equal to or greater than 1.5%, and even more preferably equal to or greater than 2.0%.

The void volume of the non-magnetic layer is a proportion of a total area of voids occupying the area of the measurement region, in a cross section image of the non-magnetic layer obtained by using a scanning electron microscope (SEM). A method for obtaining the cross section image for calculating the void volume and a method for calculating the void volume will be described below. An adjusting method of the void volume will be described later.

(1) Preparation of Sample for Cross Section Observation

A sample for cross section observation is prepared by cutting the magnetic recording medium from a randomly selected position of the magnetic recording medium, which is a target for obtaining the void volume. The preparation of the sample for cross section observation is performed by a focused ion beam (FIB) process by using a gallium ion (Ga+) beam. A specific example of such a preparation method will be described later with reference to examples.

(2) Specification of Measurement Region

The prepared sample for cross section observation is observed with a SEM and a cross section image (SEM image) is captured. As a scanning electron microscope, a field emission type scanning electron microscope (FE-SEM) is used. For example, FE-SEM S4800 manufactured by Hitachi, Ltd. can be used and, in the examples which will be described later, this FE-SEM was used.

The SEM images are captured at randomly selected positions of the same sample for cross section observation, except selecting the position so that (i) imaging ranges are not overlapped, (ii) the outermost surface on the magnetic layer side (surface of the magnetic layer) is in the SEM image, and (iii) the whole area of the sample for cross section observation in a thickness direction (that is, a region from the outermost surface on the magnetic layer side to the outermost surface on the other side) is in the SEM image, or, in a case where the whole area of the sample for cross section observation in a thickness direction is not in the SEM image, a proportion of an imaging portion of the sample for cross section observation occupying the whole image area of the SEM image is 80% to 100% based on area, and four images in total are obtained.

The SEM images are secondary electron (SE) images obtained by imaging at an acceleration voltage of 5 kV, a magnification ratio of 100,000, and a resolution of 960 pixel (vertical)×1280 pixel (horizontal).

The captured SEM image is set in WinROOF manufactured by Mitani Corporation which is image processing software and a portion of the non-magnetic layer in the SEM image (measurement region) is selected. In the selection of the measurement region, a length of the measurement region in a width direction is a total width of the captured SEM image. The "width direction" disclosed regarding the SEM image is a width direction of the imaged sample for cross section observation. The width direction of the sample for cross section observation is a width direction of the magnetic recording medium obtained by cutting this sample. Regarding this point described above, the same applies to the thickness direction.

Regarding the thickness direction, a boundary surface of the magnetic layer and the non-magnetic layer is specified by the following method. The SEM image digitalized to generate image brightness data of the thickness direction (formed of coordinates of the thickness direction, coordinates of the width direction, and three components of brightness). In the digitalization, the SEM image is divided into 1280 parts in the width direction to obtain data in 256 gradation by brightness 8-bit process, and image brightness at each divided coordinate point is converted into a predetermined gradation value. Next, in the obtained image brightness data, a brightness curve is drawn by setting an average value of brightness in the width direction at each coordinate point in the thickness direction (that is, average value of brightness at each of 1280 divided coordinate points) as a vertical axis and the coordinate in the thickness direction as a horizontal axis. The created brightness curve is differentiated to create a differential curve, a coordinate of a boundary surface between the magnetic layer and the non-magnetic layer is specified from a peak position of the created differential curve. A position on the SEM image corresponding to the specified coordinate is the boundary surface between the magnetic layer and the non-magnetic layer. In a case where the SEM image includes a portion of the non-magnetic support, the boundary surface between the non-magnetic layer and the non-magnetic support is specified. The magnetic recording medium is a coating type magnetic recording medium, and in the coating type magnetic recording medium, a boundary surface between the non-magnetic layer and the non-magnetic support can be clearly recognized, compared to the boundary surface between the magnetic layer and the non-magnetic layer. Accordingly, the boundary surface between the non-magnetic layer and the non-magnetic support can be specified by visually observing the SEM image. However, in the same manner as described above, the boundary surface thereof may be specified by using the brightness curve. In a case where the SEM image does not include a portion of the non-magnetic support, the measurement region is specified so as to include all region of the portion of the non-magnetic layer in the thickness direction from the specified boundary surface between the magnetic layer and the non-magnetic layer (that is, the surface of the non-magnetic layer). Meanwhile, in a case where the SEM image includes a portion of the non-magnetic support, the measurement region is specified so as to include all region to the specified boundary surface between the magnetic layer and the non-magnetic layer (that is, surface of the non-magnetic layer on the magnetic layer side) and the boundary surface of the non-magnetic layer and the non-magnetic support (that is, surface of the non-magnetic layer on the non-magnetic support side).

(3) Specification of Voids and Calculation of Void volume

A sharpening process which is a function of WinROOF manufactured by Mitani Corporation which is the image processing software is performed in the measurement region specified in (2), a noise removal (4 pixel/1280 pixel) process is performed, and an outline of a void present in the measurement region is highlighted. The outline of the void present in the measurement region is manually selected and the outline and the portion surrounding the outline are subjected to binarization by the image processing software. In this case, a portion where the binarization area is smaller than 25 $nm^2$, is not assumed as a void and assumed as noise, and thus, is removed from the selection. A portion where the binarization area is equal to or greater than 25 $nm^2$, is specified as a void. Next, the areas of the portions specified as voids are counted and set as a total area of the voids. The void volume is obtained from the following equation. Regarding the four images, each void volume is obtained and an arithmetical mean thereof is set as the void volume. In the following equation, in a case where the unit of the total area of voids and the area of the measurement region is the same unit, the unit thereof may be $nm^2$ or $\mu m^2$, or may be other unit.

Void volume (%)=(total area of voids/area of measurement region)×100

Among the voids present in the measurement region, a void having a part of which is in the measurement region and the other part is outside of the measurement region may be present. Regarding such a void, the area of the portion of this void in the measurement region is used in a case of calculating a total area of the voids in a case of obtaining the void volume, and the area of the portion outside of the measurement region is not included in a case of calculating a total area.

In addition, the thickness of the non-magnetic layer is a value measured by the following method.

The sample for cross section observation prepared by the method described in (1) is SEM-observed and the cross section image (SEM image) is captured. As the scanning electron microscope, a field emission type scanning electron microscope (FE-SEM) is used. For example, FE-SEM S4800 manufactured by Hitachi, Ltd. can be used and, in the examples which will be described later, this FE-SEM was used.

The SEM images are captured at randomly selected portions of the prepared sample for cross section observation, so that the whole area of the non-magnetic layer in the thickness direction, at least a part of the magnetic layer, and at least a part of the non-magnetic layer are in the SEM image. By doing so, three SEM images in total are obtained.

Each SEM image is a secondary electron (SE) image obtained by imaging at an acceleration voltage of 5 kV, a magnification ratio of 20,000, and a resolution of 960 pixel (vertical)×1280 pixel (horizontal). The boundary surface of the magnetic layer and the non-magnetic layer and the boundary surface between the non-magnetic layer and the non-magnetic support are specified by the method described in (2). In examples which will be described later, the boundary surface between the non-magnetic layer and the non-magnetic support was specified by visual observation.

In one random portion on each SEM image, a space of both boundary surfaces specified by the method in the thickness direction is obtained, and an arithmetical mean of values obtained from three images is set as the thickness of the non-magnetic layer. The thicknesses of other layers such as the magnetic layer and the non-magnetic support can be obtained by the same method. Alternatively, the thickness of the other layer may be obtained as a design thickness calculated from manufacturing conditions.

Thickness of Non-Magnetic Layer

Regarding the thickness of the non-magnetic layer, the inventors have thought that, the thick non-magnetic layer means a large number of portions which can be deformed in a forming step of the magnetic recording medium, and thus, as the non-magnetic layer is thick, the deformation of the non-magnetic layer in the forming step of the magnetic recording medium (for example, deformation of the non-magnetic layer in a calender process) easily occurs. As described above, as the non-magnetic layer is easily deformed, the projection formation agent included in the magnetic layer easily penetrates to the non-magnetic layer side, and as a result, the number of projections of the magnetic layer having a height equal to or greater than 10 nm tends to decrease. Accordingly, it is thought that a decrease in thickness of the non-magnetic layer contributes to setting the number of projections of the magnetic layer having a height equal to or greater than 10 nm to be equal to or greater than 10. From a viewpoint of ease to set the number of projections of the magnetic layer having a height equal to or greater than 10 nm to be equal to or greater than 10, the thickness of the non-magnetic layer is preferably equal to or smaller than 1.0 μm, more preferably equal to or smaller than 0.8, and even more preferably equal to or smaller than 0.6 μm. In addition, from a viewpoint of formability in a calender process, the thickness of the non-magnetic layer is preferably equal to or greater than 0.05 μm and more preferably equal to or greater than 0.1 μm.

Non-Magnetic Powder

As the non-magnetic powder included in the non-magnetic layer, only one kind of non-magnetic powder may be used, or two or more kinds of non-magnetic powder may be used. As the non-magnetic powder, at least carbon black is preferably used. As carbon black, a commercially available product may be used or a product manufactured by a well-known method can be used. By causing the non-magnetic layer to include carbon black, the surface electrical resistance value Rs of the surface of the magnetic layer can be decreased. The details of the surface electrical resistance value Rs of the surface of the magnetic layer are as described above.

Powder having a small particle size is used as the non-magnetic powder included in the non-magnetic layer and dispersibility of the non-magnetic powder is increased, and accordingly, the void volume of the non-magnetic layer tends to decrease. In addition, the use of powder having a small particle size as the non-magnetic powder included in the non-magnetic layer and an increase in dispersibility of the non-magnetic powder contribute to a decrease roughness of the surface of the non-magnetic layer. It is thought that this contributes to improvement of the flatness of the base portion of the surface of the magnetic layer formed on the surface of the non-magnetic layer. For example, regarding carbon black, a specific surface area can be used as an index for the particle size. From a viewpoint of decreasing the void volume of the non-magnetic layer, the specific surface area of carbon black is preferably equal to or greater than 280 $m^2/g$ and more preferably equal to or greater than 300 $m^2/g$. From a viewpoint of ease of improvement of dispersibility, the specific surface area of carbon black is preferably equal to or smaller than 500 $m^2/g$ or more preferably equal to or smaller than 400 $m^2/g$. A proportion of carbon black occupying the non-magnetic powder of the non-magnetic layer is preferably equal to or greater than 30.0% by mass, more preferably equal to or greater than 40.0% by mass, even more preferably equal to or greater than 50.0% by mass, and may be equal to or greater than 60.0% by mass, equal to or greater than 70.0% by mass, equal to or greater than 80.0% by mass, equal to or greater than 90.0% by mass, or 100.0% by mass (that is, the non-magnetic powder is only carbon black) with respect to a total amount of the non-magnetic powder. In addition, a proportion of carbon black occupying the non-magnetic powder of the non-magnetic layer can be, for example, equal to or smaller than 90.0% by mass or equal to or smaller than 80.0% by mass with respect to a total amount of the non-magnetic powder. However, as described above, the non-magnetic powder of the non-magnetic layer may be only carbon black. A content (filling percentage) of the non-magnetic powder in the non-magnetic layer is preferably 50% to 90% by mass and more preferably 60% to 90% by mass.

As the non-magnetic powder other than carbon black, inorganic powder or organic powder may be used. An average particle size of these non-magnetic powder is preferably 10 to 200 nm and more preferably 10 to 100 nm.

Examples of the inorganic powder include powder of metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to.

Binding Agent

According to the studies of the inventors, regarding the improvement of dispersibility of carbon black, it was found that the use of a vinyl chloride resin as a binding agent causes a useful tendency to the improvement of dispersibility of carbon black. From a viewpoint of the improvement of dispersibility of carbon black, at least a vinyl chloride resin is preferably used as the binding agent of the non-magnetic layer, and in a case of using a plurality of kinds of resins as the binding agent, it is preferable to increase a proportion of the vinyl chloride resin. For example, in one aspect, a proportion of the vinyl chloride resin with respect to a total amount of the binding agent of the non-magnetic layer is preferably equal to or greater than 30.0% by mass, more preferably equal to or greater than 50.0% by mass, even more preferably equal to or greater than 80.0% by mass, and still more preferably 90.0% by mass to 100.0% by mass. In addition, the content of the binding agent in the non-magnetic layer can be, for example, 10.0 to 40.0 parts by mass with respect to 100.0 parts by mass of the non-magnetic powder.

Additives

A non-magnetic layer forming composition can be, for example, prepared by mixing non-magnetic powder, a binding agent, and one or more kinds of additives and one or more kinds of solvents which are randomly added, with each other at the same time or in order and performing a dispersion process. Details of the dispersion process will be described later. As the dispersion time becomes longer, the dispersibility of the non-magnetic powder in the non-magnetic layer tends to be improved and void volume tends to decrease. In addition, it is possible to improve dispersibility of the non-magnetic powder in the non-magnetic layer, by causing the non-magnetic layer forming composition to include an additive (dispersing agent) which contributes to the improvement of dispersibility of the non-magnetic powder.

As the dispersing agent, one or more kinds of well-known dispersing agent can be used according to the kinds of the non-magnetic powder of the non-magnetic layer. For example, organic tertiary amine can be used as the dispersing agent of carbon black. For the organic tertiary amine, a description disclosed in paragraphs 0011 to 0018 and 0021 of JP2013-049832A can be referred to. In addition, for treatment or the like of the composition for increasing dispersibility of carbon black by the organic tertiary amine, a description disclosed in paragraphs 0022 to 0024 and 0027 of JP2013-049832A can be referred to.

the amine is more preferably trialkyl amine. An alkyl group including trialkyl amine is preferably an alkyl group having 1 to 18 carbon atoms. Three alkyl groups included in the trialkyl amine may be the same as each other or different from each other. For details of the alkyl group, a description disclosed in paragraphs 0015 and 0016 of JP2013-049832A can be referred to. As trialkyl amine, trioctylamine is particularly preferable.

In the non-magnetic layer, one or more kinds of well-known other additives can be suitably selected from commercially available products according to the desired properties or manufactured by a well-known method and used in a random amount.

In the invention and the specification, the non-magnetic layer also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m(100 Oe), or a layer having a residual magnetic flux density equal to or smaller than 10 mT and coercivity equal to or smaller than 7.96 kA/m(100 Oe). It is preferable that the non-magnetic layer does not have a residual magnetic flux density and coercivity.

Non-Magnetic Support

Next, the non-magnetic support (hereinafter, also simply referred to as a "support") will be described. As the non-magnetic support, well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance. A thickness of the non-magnetic support is, for example, 3.0 to 80.0 μm, preferably 3.0 to 50.0 μm, and more preferably 3.0 to 10.0 μm.

Back Coating Layer

The magnetic recording medium can also include a back coating layer including non-magnetic powder and a binding agent on a surface side of the non-magnetic support opposite to the surface side provided with the magnetic layer. The back coating layer preferably includes any one or both of carbon black and inorganic powder. For details of the back coating layer, a well-known technology regarding the back coating layer can be applied. In addition, in regards to the binding agent included in the back coating layer and various additives which can be randomly included therein, a well-known technology regarding the treatment of the magnetic layer and/or the non-magnetic layer can be applied. A thickness of the back coating layer is preferably equal to or smaller than 0.9 μm and more preferably 0.1 to 0.7 μm.

Manufacturing Step

Preparation of Each Layer Forming Composition

A composition for forming the magnetic layer, the non-magnetic layer, or the back coating layer normally includes a solvent, together with various components described above. As the solvent, one kind or two or more kinds of various solvents generally used for manufacturing a coating type magnetic recording medium can be used. The content of the solvent in each layer forming composition is not particularly limited. For the solvent, a description disclosed in a paragraph 0153 of JP2011-216149A can be referred to. A concentration of solid content and a solvent composition in each layer forming composition may be suitably adjusted according to handleability of the composition, coating conditions, and a thickness of each layer to be formed. Steps of preparing the composition for forming the magnetic layer, the non-magnetic layer, or the back coating layer generally include at least a kneading step, a dispersing step, and a mixing step provided before and after these steps, if necessary. Each step may be divided into two or more stages. All of raw materials used in the preparation of each layer forming composition may be added at an initial stage or in a middle stage of each step. In addition, each raw material may be separately added in two or more steps. For example, the binding agent may be separately added in the kneading step, the dispersing step, and a mixing step for adjusting a viscosity after the dispersion. In the manufacturing step of the magnetic recording medium, a well-known manufacturing technology of the related art can be used as a part of step. In the kneading step, an open kneader, a continuous kneader, a pressure kneader, or a kneader having a strong kneading force such as an extruder is preferably used. The details of the kneading step is disclosed in JP1989-106338A (JP-H01-106338A) and JP1989-79274A (JP-H01-79274A). As a disperser, various well known disperser using a shear force such as a beads mill, a ball mill, a sand mill, or a homogenizer can be used. In the dispersion, the dispersion beads can be preferably used. As dispersion beads, ceramic beads or glass beads are used and zirconia beads are preferable. A combination of two or more kinds of beads may be used. A bead diameter (particle diameter) and a beads filling percentage of the dispersion beads are not particularly limited and may be suitably set according to powder which is a dispersion target. Each layer forming composition may be filtered by a well-known method before performing the coating step. The filtering can be performed by using a filter, for example. As the filter used in the filtering, a filter having a hole diameter of 0.01 to 3 μm (for example, filter made of glass fiber or filter made of polypropylene) can be used, for example.

Coating Step

The non-magnetic layer and the magnetic layer can be formed by performing multilayer coating of the non-magnetic layer forming composition and the magnetic layer forming composition in order or at the same time. The back coating layer can be formed by applying the back coating layer forming composition to the surface of the non-magnetic support opposite to a surface provided with the non-magnetic layer and the magnetic layer (or to be provided with the non-magnetic layer and/or the magnetic layer). For details of the coating for forming each layer, a description disclosed in a paragraph 0066 of JP2010-231843A can be referred to.

Other Steps

For example, after the coating step, a calender process is preferably performed. As the calender process is reinforced, a value of the Rmax tends to decrease and the number of projections having a height equal to or greater than 10 nm tends to decrease. Accordingly, the Rmax and the number of projections having a height equal to or greater than 10 nm can be adjusted according to the calender process conditions. For example, as a roll having a hard surface is used as a calender roll or as the number of steps of a calender roll increases, the value of the Rmax tends to decrease and the number of projections having a height equal to or greater than 10 nm tends to decrease. In addition, regarding the conditions of the calender process, for example, a calender pressure (linear pressure) can be 200 to 500 kN/m and is preferably 250 to 350 kN/m. A calender temperature (surface temperature of a calender roll) can be, for example, 70° C. to 120° C. and is preferably 80° C. to 100° C., and the calender speed can be, for example, 50 to 300 m/min and is preferably 50 to 200 m/min.

For various other steps for manufacturing the magnetic recording medium, a description disclosed in paragraphs 0067 to 0070 of JP2010-231843A can be referred to.

The magnetic recording medium according to one aspect of the invention can be a tape-shaped magnetic recording medium (magnetic tape) or can also be a disk-shaped magnetic recording medium (magnetic disk). For example, the magnetic tape is normally accommodated in a magnetic tape cartridge and the magnetic tape cartridge is mounted in a magnetic recording and reproducing device. A servo pattern can also be formed in the magnetic tape by a well-known method, in order to allow head tracking servo to be performed in the magnetic recording and reproducing device. According to one aspect of the invention, in a case of causing the magnetic tape to run in the magnetic recording and reproducing device to reproduce information recorded on the magnetic tape, it is possible maintain a low coefficient of friction between the surface of the magnetic layer and the magnetic head and to reproduce information with high electromagnetic conversion characteristics.

Magnetic Recording and Reproducing Device

One aspect of the invention relates to a magnetic recording and reproducing device including the magnetic recording medium and a magnetic head.

In the invention and the specification, the "magnetic recording and reproducing device" means a device capable of performing at least one of the recording of information on the magnetic recording medium or the reproducing of information recorded on the magnetic recording medium. Such a device is generally called a drive. The magnetic head included in the magnetic recording and reproducing device can be a recording head capable of performing the recording of information on the magnetic recording medium, or can be a reproducing head capable of performing the reproducing of information recorded on the magnetic recording medium. In addition, in one aspect, the magnetic recording and reproducing device can include both of a recording head and a reproducing head as separate magnetic heads. In another aspect, the magnetic head included in the magnetic recording and reproducing device can also have a configuration of including both of a recording element and a reproducing element in one magnetic head. As the reproducing head, a magnetic head (MR head) including a magnetoresistive element capable of sensitively reading information recorded on the magnetic recording medium as a reproducing element is preferable. As the MR head, various well-known MR heads can be used. In addition, the magnetic head which performs the recording of information and/or the reproducing of information may include a servo pattern reading element. Alternatively, as a head other than the magnetic head which performs the recording of information and/or the reproducing of information, a magnetic head (servo head) including a servo pattern reading element may be included in the magnetic recording and reproducing device.

In the magnetic recording and reproducing device, the recording of information on the magnetic recording medium and the reproducing of information recorded on the magnetic recording medium can be performed by bringing the surface of the magnetic layer of the magnetic recording medium into contact with the magnetic head and sliding. The magnetic recording and reproducing device may include the magnetic recording medium according to one aspect of the invention and well-known technologies can be applied for other configurations.

EXAMPLES

Hereinafter, the invention will be described with reference to examples. However, the invention is not limited to aspects shown in the examples. "Parts" in the following description is based on mass.

Silica colloid particles (colloidal silica) used in the following examples and comparative examples are commercially available silica colloid particles prepared by sol-gel method and had properties corresponding to the definition of the colloid particles described above. An average particle size $\phi$ and a coefficient of variation CV value of these silica colloid particle size shown in Table 1 which will be described later are values obtained by the method described above.

Example 1

List of Magnetic Layer Forming Composition
Magnetic Liquid
Ferromagnetic hexagonal barium ferrite powder: 100.0 parts
(coercivity Hc: 175 kA/m (2,200 Oe), average particle size: 27 nm)
Oleic acid: 2.0 parts
A vinyl chloride resin: 10.0 parts
(MR-104 manufactured by Kaneka Corporation)
A polyurethane resin: 4.0 parts
(UR-4800 manufactured by Toyobo Co., Ltd. (sulfonic acid group-containing polyester polyurethane resin))
Methyl ethyl ketone: 150.0 parts
Cyclohexanone: 150.0 parts
Abrasive Solution
Alumina powder (α-alumina having a specific surface area of 19 $m^2/g$): 6.0 parts
A polyurethane resin: 0.6 parts
(UR-4800 manufactured by Toyobo Co., Ltd. (sulfonic acid group-containing polyester polyurethane resin))
Cyclohexanone: 23.0 parts
Silica Sol
Silica colloid particles (colloidal silica): see Table 1
Methyl ethyl ketone: 16.0 parts
Other Components
Stearic acid: 2.0 parts
Stearic acid amide: 0.3 parts
Butyl stearate: 6.0 parts
Methyl ethyl ketone: 110.0 parts
Cyclohexanone: 110.0 parts
Polyisocyanate (CORONATE L manufactured by Tosoh Corporation): 3.0 parts
List of Non-Magnetic Layer Forming Composition
Carbon black: 100.0 parts
(specific surface area: see Table 1, Dibutyl phthalate (DBP) oil absorption amount: 65 $cm^3/100$ g
Trioctylamine: 4.0 parts
A vinyl chloride resin: see Table 1
(MR-104 manufactured by Kaneka Corporation)
Methyl ethyl ketone: 510.0 parts
Cyclohexanone: 200.0 parts
Stearic acid: 1.5 parts
Stearic acid amide: 0.3 parts
Butyl stearate: 1.5 parts
List of Back Coating Layer Forming Composition
Carbon black: 100.0 parts
(average particle size: 40 nm, DBP oil absorption amount: 74 $cm^3/100$ g
Copper phthalocyanine: 3.0 parts
Nitrocellulose: 25.0 parts
A polyurethane resin: 60.0 parts
(UR-8401 manufactured by Toyobo Co., Ltd. (sulfonic acid group-containing polyester polyurethane resin))
A polyester resin: 4.0 parts
(VYLON 500 manufactured by Toyobo Co., Ltd.)
Alumina powder (α-alumina having a specific surface area of 17 $m^2/g$): 1.0 parts
Polyisocyanate: 15.0 parts
(CORONATE L manufactured by Tosoh Corporation)
Methyl ethyl ketone: 1510.0 parts
Toluene: 250.0 parts
Preparation of Each Layer Forming Composition
The magnetic layer forming composition was prepared by the following method.
The components of the magnetic liquid were mixed and dispersed in a transverse beads mill disperser. In the dispersion process, the dispersion process of 30 passes was performed with zirconia ($ZrO_2$) beads having a bead diameter of 0.1 mm (hereinafter, referred to as "Zr beads"), by setting a bead filling percentage as 80 volume %, a circumferential speed of rotor distal end as 10 m/sec, and a retention time for 1 pass as 2 minutes.

Regarding the abrasive solution, a mixture of the components of the abrasive solution (alumina powder, polyurethane resin, and cyclohexanone) was prepared, this mixture was put in a transverse beads mill disperser together with Zr beads having a bead diameter of 0.3 mm, so as to perform the adjustment so that a value of bead volume/(abrasive solution volume+bead volume) was 80%, the beads mill dispersion process was performed for 120 minutes, the liquid after the process was extracted, and an ultrasonic dispersion filtering process was performed by using a flow type ultrasonic dispersion filtering device.

The magnetic layer forming composition was prepared by introducing the magnetic liquid, the abrasive solution, silica sol, and the other components in a dissolver stirrer, stirring the mixture at a circumferential speed of 10 m/sec for 30 minutes, and performing a process of 3 passes at a flow rate of 7.5 kg/min with a flow type ultrasonic disperser, and filtering the mixture with a filter having a hole diameter of 1 μm.

A non-magnetic layer forming composition was prepared as follows.

The components excluding a lubricant (stearic acid, stearic acid amide, and butyl stearate) were mixed and dispersed in a transverse beads mill disperser. In the dispersion process, the dispersion process of 30 passes was performed with Zr beads having a bead diameter of 0.1 mm, by setting a bead filling percentage as 80 volume %, a circumferential speed of rotor distal end as 10 m/sec, and a retention time for 1 pass as 2 minutes. After that, the lubricant and methyl ethyl ketone for adjusting a coating thickness were added and stirred and mixed in a dissolver stirrer to prepare a non-magnetic layer forming composition.

In Example 1, and Examples 2 to 4 and Comparative Examples 1 to 7 which will be described later, in a case of preparing the non-magnetic layer forming composition, methyl ethyl ketone for adjusting a coating thickness was used with an amount of 70.0 to 510.0 parts by mass with respect to 100.0 parts by mass of the non-magnetic powder used for preparing the non-magnetic layer forming composition.

A back coating layer forming composition was prepared as follows.

The components excluding polyisocyanate were introduced in a dissolver stirrer and stirred at a circumferential speed of 10 m/sec for 30 minutes, and subjected to a dispersion process by a transverse beads mill disperser. After that, polyisocyanate was added, stirred and mixed in a dissolver stirrer to prepare a back coating layer forming composition.

Preparation of Magnetic Tape

The non-magnetic layer forming composition was applied to one surface of a support made of polyethylene naphthalate having a thickness of 6.0 μm so that the thickness after the drying becomes a thickness shown in Table 1 and was dried, and the back coating layer forming composition was applied to the opposite surface of the support so that the thickness after the drying becomes 0.5 μm and was dried.

Then, the magnetic layer forming composition was applied onto the non-magnetic layer so that the thickness after the drying becomes a thickness shown in Table 1 and was dried.

After that, a calender process was performed by using a calender roll configured of only a metal roll, at a speed of 80 m/min, linear pressure of 300 kg/cm (294 kN/m), and a surface temperature of a calender roll of 100° C., and the heat treatment was performed in the environment of the atmosphere temperature of 70° C. for 36 hours.

Examples 2 to 4 and Comparative Examples 1 to 7

A magnetic tape was manufactured by the same method as in Example, except that various conditions were changed as shown in Table 1 and the amount of methyl ethyl ketone used for adjusting the coating thickness used for preparing the non-magnetic layer forming composition is changed.

The polyurethane resin used for preparing the non-magnetic layer forming composition in the comparative example is UR-4800 manufactured by Toyobo Co., Ltd. (sulfonic acid group-containing polyester polyurethane resin).

In Comparative Example 4, in order to prepare the non-magnetic layer forming composition, 20.0 parts by mass of carbon black (specific surface area: 260 m$^2$/g) and 80.0 parts by mass of α-iron oxide (average particle size (average long axis length): 150 nm) were used.

Evaluation Method

Rsk and Rmax of Magnetic Layer, and Number of Projections of Magnetic Layer Having Height Equal to or Greater Than 10 nm The Rsk and the Rmax of the magnetic layer and the number of projections having a height equal to or greater than 10 nm were obtained by setting the size of the measurement region as a size of 5 μm×5 μm by the method described above. Nanoscope 4 manufactured by Veeco Instruments, Inc. was used as the AFM in a tapping mode, RTESP-300 manufactured by Bruker Corporation was used as a probe of AFM, a resolution was set as 512 pixel×512 pixel, a scanning speed was set as a speed measured in a case where the scanning speed in one screen (512 pixel×512 pixel) was 341 seconds.

Void Volume of Non-Magnetic Layer and Various Thicknesses

The sample for cross section observation was prepared by the following method. The void volume of the non-magnetic layer and the thicknesses of the non-magnetic layer, the magnetic layer, the back coating layer, and the support were obtained by using the prepared sample for cross section observation by the method described above. FE-SEM S4800 manufactured by Hitachi, Ltd. was used as a field emission type scanning electron microscope (FE-SEM) for SEM observation.

(i) A sample of the magnetic tape having a size of a width direction 10 mm×longitudinal direction 10 mm was cut by using a blade.

A protective film was formed on the surface of the magnetic layer of the cut sample to obtain the sample attached with the protective film. The formation of the protective film was performed by the following method.

A platinum (Pt) film (thickness of 30 nm) was formed on the surface of the magnetic layer of the sample by sputtering. The sputtering of the platinum film was performed under the following conditions.

Sputtering Conditions of Platinum Film

Target: Pt

Degree of vacuum in chamber of sputtering device: equal to or smaller than 7 Pa

Current value: 15 mA

A carbon film having a thickness of 100 to 150 nm was further formed on the sample attached with platinum film manufactured described above. The formation of the carbon film was performed by a chemical vapor deposition (CVD)

mechanism using a gallium ion (Ga+) beam provided with a focused ion beam (FIB) device used in the following section (ii).

(ii) The FIB processing using the gallium ion (Ga+) beam was performed with respect to the sample attached with the protective film manufactured in the section (i) by the FIB device and the cross section of the magnetic tape was exposed. An acceleration voltage in the FIB processing was 30 kV and a probe current was 1300 pA.

The sample for cross section observation exposed as described above was used for SEM observation for obtaining the void volume and the thickness of the non-magnetic layer.

Electromagnetic Conversion Characteristics

Regarding each magnetic tape of the examples and the comparative examples, an SNR was measured with a reel tester having a width of ½ inches (0.0127 meters) to which a magnetic head was fixed. A magnetic head/magnetic tape relative speed was set as 5.5 m/sec. The recording was performed by using a metal-in-gap (MIG) head (gap length of 0.15 μm, track width of 1.0 μm), and a recording current was set as an optimal recording current of each magnetic tape. As a reproducing head, a giant-magnetoresistive (GMR) head having an element thickness of 15 nm, a shield interval of 0.1 μm, and a lead width of 0.5 μm was used. A signal having linear recording density (540 kfci) was recorded a reproducing signal was measured with a spectrum analyzer manufactured by Shibasoku Co., Ltd., and a ratio of an output of a carrier signal and integral noise over whole spectral range was set as an SNR.

Regarding the comparative example in which the SNR could not be evaluated due to sticking between the surface of the magnetic layer of the magnetic tape and the reproducing head during the evaluation, "unable to evaluate (sticking)" was shown in Table 1.

Measurement of Coefficient of Friction

In a state where each magnetic tape of the examples and the comparatives was wound around a round bar made of AlTic (alumina titanium carbide) having a center line average surface roughness Ra of 15 nm and a diameter of 4 mm, in a case of being measured with AFM regarding a size of 40 μm×40 μm, so that a width direction of the magnetic tape is parallel to an axial direction of the round bar, a weight of 100 g was suspended on one end of the magnetic tape, and the other end was attached to a load cell, the magnetic tape was slid by 45 mm per pass at a speed of 14 mm/sec, and the sliding of 100 passes in total was repeated. A weight during the sliding at the constant speed of first pass and the 100th pass at this time was detected by a load cell to obtain a measurement value, and coefficient of frictions of the first pass and the 100th pass were calculated based on the following equation: coefficient of friction=ln (measurement value (g)/100 (g))/π.

Regarding the comparative example in which the coefficient of friction could not be evaluated due to sticking between the surface of the magnetic layer of the magnetic tape and the round bar during the evaluation, "unable to evaluate (sticking)" was shown in Table 1. Since the coefficient of friction corresponding to the measurement upper limit value of the load cell is 0.80, a coefficient of friction exceeding 0.80 cannot be measured. Therefore, regarding the comparative example in which the coefficient of friction is greater than the measurement upper limit value of the load cell, "greater than 0.80" is shown in Table 1.

Surface Electrical Resistance Value Rs

Regarding each magnetic tape of the examples and the comparative examples, the surface electrical resistance value Rs of the surface of the magnetic layer, in a case where a voltage of 50 V was applied, was measured, by using an international electrotechnical commission type (IEC) Rs measurement tool and a digital superinsulating resistance measurement device with a width of ½ inches (0.0127 meters) (TR-811A manufactured by Takeda Riken Industries).

The result of the above measurement is shown in Table 1.

TABLE 1

| | Magnetic layer | | | | | Non-magnetic layer | | | |
|---|---|---|---|---|---|---|---|---|---|
| | Silica colloid particles | | | Magnetic layer | | Non-magnetic powder | | Binding agent | Non-magnetic layer thickness [μm] |
| | Average particle size φ[nm] | Coefficient of variation CV[%] | Content [parts by mass] | thickness t [nm] | φ/t | Kind | Specific surface area [m²/g] | Vinyl chloride resin [parts by mass] | Polyurethane resin [parts by mass] | |
| Example 1 | 130 | 10.0 | 4.0 | 70 | 1.9 | Carbon black | 320 | 30.0 | None | 0.4 |
| Example 2 | 130 | 10.0 | 4.0 | 70 | 1.9 | Carbon black | 320 | 30.0 | None | 0.2 |
| Example 3 | 150 | 10.0 | 2.8 | 70 | 2.1 | Carbon black | 320 | 30.0 | None | 0.7 |
| Example 4 | 100 | 12.0 | 1.8 | 70 | 1.4 | Carbon black | 320 | 30.0 | None | 0.4 |
| Comparative Example 1 | 130 | 10.0 | 4.0 | 70 | 1.9 | Carbon black | 260 | 12.0 | 8.0 | 1.0 |
| Comparative Example 2 | 130 | 10.0 | 4.0 | 70 | 1.9 | Carbon black | 260 | 12.0 | 8.0 | 0.4 |
| Comparative Example 3 | 130 | 10.0 | 4.0 | 70 | 1.9 | Carbon black | 260 | 30.0 | None | 0.4 |
| Comparative Example 4 | 130 | 10.0 | 4.0 | 70 | 1.9 | Carbon black (specific surface area 260 m²/g) + α-iron oxide (average particle size 150 nm) | | None | 6.0 | 0.4 |

TABLE 1-continued

| | | | | | | | | | | |
|---|---|---|---|---|---|---|---|---|---|---|
| Comparative Example 5 | 230 | 8.0 | 14.0 | 70 | 3.3 | Carbon black | 260 | 12.0 | 8.0 | 0.4 |
| Comparative Example 6 | 60 | 14.0 | 0.4 | 70 | 0.9 | Carbon black | 320 | 30.0 | None | 0.4 |
| Comparative Example 7 | 130 | 10.0 | 4.0 | 70 | 1.9 | Carbon black | 138 | None | 30.0 | 1.0 |

| | Surface of magnetic layer | | | | | Evaluation result | | |
|---|---|---|---|---|---|---|---|---|
| | Void volume [%] | Rsk | Rmax [nm] | Number of projections having height equal to or greater than 10 nm [piece/5 μm] | Surface electrical resistance value Rs [Ω/sq] | Coefficient of friction | | SNR [dB] |
| | | | | | | First pass | 100th pass | |
| Example 1 | 2.5 | 0.52 | 21.0 | 25 | $1.7 \times 10^{+5}$ | 0.17 | 0.30 | 2.8 |
| Example 2 | 2.0 | 0.73 | 28.0 | 40 | $8.9 \times 10^{+5}$ | 0.17 | 0.22 | 2.0 |
| Example 3 | 7.5 | 0.23 | 20.0 | 11 | $1.3 \times 10^{+4}$ | 0.25 | 0.38 | 3.5 |
| Example 4 | 2.5 | 0.25 | 20.0 | 10 | $1.7 \times 10^{+5}$ | 0.25 | 0.38 | 3.8 |
| Comparative Example 1 | 23.0 | −0.30 | 23.5 | 0 | $1.0 \times 10^{+4}$ | Greater than 0.80 | unable to evaluate (sticking) | unable to evaluate (sticking) |
| Comparative Example 2 | 18.0 | −0.10 | 26.0 | 5 | $3.3 \times 10^{+4}$ | Greater than 0.80 | unable to evaluate (sticking) | unable to evaluate (sticking) |
| Comparative Example 3 | 7.7 | −0.10 | 26.0 | 10 | $3.3 \times 10^{+4}$ | 0.50 | unable to evaluate (sticking) | 0.0 (Reference) |
| Comparative Example 4 | 17.0 | −0.10 | 26.0 | 0 | $9.0 \times 10^{+5}$ | Greater than 0.80 | unable to evaluate (sticking) | unable to evaluate (sticking) |
| Comparative Example 5 | 18.0 | 0.30 | 33.0 | 25 | $1.0 \times 10^{+4}$ | 0.17 | 0.30 | −3.8 |
| Comparative Example 6 | 2.5 | 0.04 | 20.0 | 5 | $1.0 \times 10^{+4}$ | Greater than 0.80 | unable to evaluate (sticking) | unable to evaluate (sticking) |
| Comparative Example 7 | 28.0 | −2.00 | 28.0 | 0 | $1.0 \times 10^{+4}$ | Greater than 0.80 | unable to evaluate (sticking) | unable to evaluate (sticking) |

From the result shown in Table 1, it is possible to confirm that the magnetic tape of the example has a low coefficient of friction at the time of running and exhibits excellent electromagnetic conversion characteristics.

Research Regarding Measurement Region and Measurement Value

Regarding each magnetic tape of the examples and the comparative examples, the skewness Rsk and the center line average surface roughness Ra of the surface of the magnetic layer were obtained by using Zygo manufactured by Canon Inc. which is a three-dimensional surface roughness tester. The measurement using the three-dimensional surface roughness tester was performed in three different regions of the surface of the magnetic layer and an arithmetical mean of the obtained values was obtained. In the measurement using Zygo manufactured by Canon Inc., a size of the measurement region is 265 μm×353 μm.

In addition, regarding each magnetic tape of the examples and the comparative examples, the center line average surface roughness Ra was obtained from the measurement result obtained by using the AFM which was performed for obtaining the Rsk or the like described above. The measurement of this Ra was also performed in three different regions of the surface of the magnetic layer and an arithmetical mean of the obtained values was obtained.

The result of the above measurement is shown in Table 2.

TABLE 2

| | AFM (measurement region: 5 μm × 5 μm) | | Three-dimensional surface roughness tester (measurement region: 265 μm × 353 μm) | |
|---|---|---|---|---|
| | Rsk | Ra [nm] | Rsk | Ra [nm] |
| Example 1 | 0.52 | 1.3 | 0.01 | 0.87 |
| Example 2 | 0.73 | 1.5 | 0.62 | 0.90 |
| Example 3 | 0.23 | 1.2 | 0.35 | 0.85 |
| Example 4 | 0.25 | 1.1 | 0.00 | 0.70 |
| Comparative Example 1 | −0.30 | 1.4 | −0.15 | 1.80 |
| Comparative Example 2 | −0.10 | 1.4 | −0.07 | 1.05 |
| Comparative Example 3 | −0.10 | 1.4 | −0.01 | 0.96 |
| Comparative Example 4 | −0.10 | 1.4 | 0.13 | 1.09 |
| Comparative Example 5 | 0.30 | 2.1 | 0.55 | 1.15 |
| Comparative Example 6 | 0.04 | 1.1 | 0.00 | 0.70 |
| Comparative Example 7 | −2.00 | 1.9 | 0.03 | 2.80 |

As shown in Table 2, a correlation between the Rsk obtained by using the AFM and the Rsk obtained by using the three-dimensional surface roughness tester is not found, and a correlation between the Rsk obtained by using the AFM and the Ra obtained by using the three-dimensional surface roughness tester is not found either. In addition, as shown in Table 2, a correlation between the Rsk and the Ra obtained by using the AFM is not found either.

In contrast, by setting the Rsk obtained by using the AFM an index with the Rmax obtained by using the AFM and the number of projections having a height equal to or greater than 10 nm, it is possible to provide a magnetic recording medium capable of satisfying both a decrease in coefficient of friction at the time of running and improvement of electromagnetic conversion characteristics.

One aspect of the invention can be effective in a technical field of various magnetic recording medium such as a magnetic tape for data storage.

What is claimed is:

1. A magnetic recording medium comprising:
a non-magnetic support;
a non-magnetic layer including a non-magnetic powder and a binding agent on the non-magnetic support; and
a magnetic layer including a ferromagnetic powder, a binding agent, and a non-magnetic powder on the non-magnetic layer,
wherein a skewness Rsk obtained using an atomic force microscope in a measurement region of a surface of the magnetic layer having a size of 5 µm×5 µm is greater than 0,
a maximum peak height Rmax is equal to or smaller than 30.0 nm, and
the number of projections having a height equal to or greater than 10 nm is equal to or greater than 10.

2. The magnetic recording medium according to claim 1, wherein a thickness of the non-magnetic layer is equal to or smaller than 1.0 µm.

3. The magnetic recording medium according to claim 1, wherein a proportion of voids in a cross section image obtained by imaging a cross section of the non-magnetic layer with a scanning electron microscope is equal to or smaller than 10.0%.

4. The magnetic recording medium according to claim 3, wherein the proportion of voids is 1.0% to 10.0%.

5. The magnetic recording medium according to claim 1, wherein the skewness Rsk is greater than 0.10.

6. The magnetic recording medium according to claim 1, wherein the maximum peak height Rmax is 10.0 to 30.0 nm.

7. The magnetic recording medium according to claim 1, wherein the number of projections is 10 to 60.

8. The magnetic recording medium according to claim 1, wherein the non-magnetic powder included in the non-magnetic layer includes carbon black.

9. The magnetic recording medium according to claim 8, wherein a specific surface area of carbon black included in the non-magnetic layer is 280 to 500 m$^2$/g.

10. The magnetic recording medium according to claim 8, wherein the non-magnetic layer includes carbon black, a mass of which is equal to or greater than 30.0% by mass with respect to a total amount of the non-magnetic powder.

11. The magnetic recording medium according to claim 1, wherein the non-magnetic powder included in the magnetic layer includes at least colloid particles.

12. The magnetic recording medium according to claim 11, wherein the colloid particles are silica colloid particles.

13. The magnetic recording medium according to claim 1, wherein a surface electrical resistance value Rs of the surface of the magnetic layer is smaller than $1.0 \times 10^{+7}$ Ω/sq.

14. A magnetic recording and reproducing device comprising:
the magnetic recording medium according to claim 1; and
a magnetic head.

* * * * *